(12) United States Patent
Bohner et al.

(10) Patent No.: US 9,821,859 B2
(45) Date of Patent: *Nov. 21, 2017

(54) METHOD FOR PRODUCING A MOTOR VEHICLE COMPONENT FROM ALUMINUM

(71) Applicant: Benteler Automobiltechnik GmbH, Paderborn (DE)

(72) Inventors: Friedrich Bohner, Oerlinghausen (DE); Jochen Doerr, Bad Driburg (DE); Jochem Grewe, Salzkotten (DE); Christian Hielscher, Delbrueck (DE); Joern Toelle, Paderborn (DE); Boris Rauscher, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 261 days.

This patent is subject to a terminal disclaimer.

(21) Appl. No.: 14/683,759

(22) Filed: Apr. 10, 2015

(65) Prior Publication Data
US 2015/0353146 A1 Dec. 10, 2015

(30) Foreign Application Priority Data

Jun. 10, 2014 (DE) .................. 10 2014 108 113

(51) Int. Cl.
*C22F 1/04* (2006.01)
*B62D 29/00* (2006.01)
(Continued)

(52) U.S. Cl.
CPC .......... *B62D 29/008* (2013.01); *B21D 22/022* (2013.01); *B21D 53/88* (2013.01);
(Continued)

(58) Field of Classification Search
CPC ........................................ C22F 1/04
(Continued)

(56) References Cited

U.S. PATENT DOCUMENTS

| 2010/0218860 A1 | 9/2010 | Doerr et al. |
| 2013/0020000 A1 | 1/2013 | Carter |
| 2013/0127197 A1 | 5/2013 | Diersmann et al. |

FOREIGN PATENT DOCUMENTS

| CN | 101514436 A | 8/2009 |
| CN | 102886457 A | 1/2013 |

(Continued)

OTHER PUBLICATIONS

Kathleen Siefert et al.; "Enhancement of Forming Limits of Aluminum Alloys Using an Intermediate Heat Treatment", AIP Conference Proceedings, Oct. 27, 2010; pp. 359-364.
(Continued)

*Primary Examiner* — Brian Walck
(74) *Attorney, Agent, or Firm* — Hauptman Ham, LLP

(57) ABSTRACT

A method for producing a motor vehicle component is disclosed having the steps of providing a strain-hardened blank composed of a 5000 grade aluminum alloy, partially heating the blank in a first region to a temperature higher than 350° C., in particular higher than 400° C., and in a second region to a temperature between 150° C. and 350° C., preferably to 300° C., in less than 20 s, preferably less than 10 s and in particular in 2 to 5 s, and transferring the blank into a cooling tool, and performing cooling in less than 20 s, preferably less than 10 s and in particular in 2 to 5 s.

18 Claims, 3 Drawing Sheets

Figure 1A:
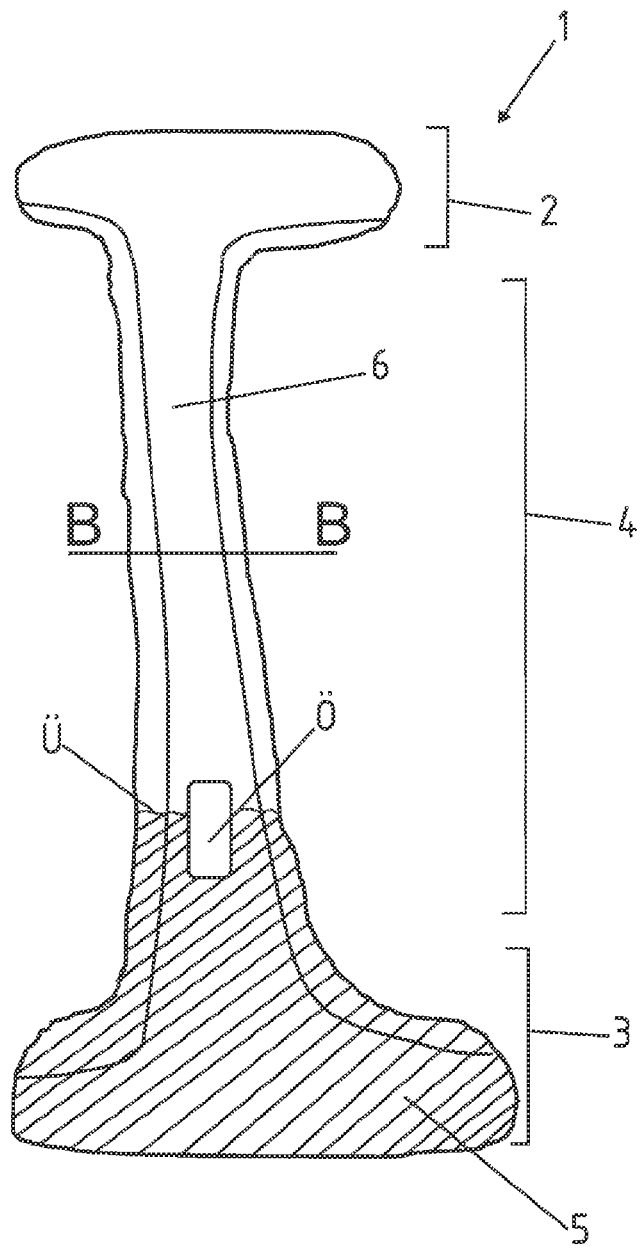

(51) Int. Cl.
  *C22C 21/00* (2006.01)
  *C21D 9/46* (2006.01)
  *C21D 1/673* (2006.01)
  *C22C 21/06* (2006.01)
  *C22F 1/047* (2006.01)
  *B21D 22/02* (2006.01)
  *B21D 53/88* (2006.01)
  *B21D 35/00* (2006.01)
  *C21D 8/02* (2006.01)
  *B62D 25/04* (2006.01)

(52) U.S. Cl.
  CPC .......... *B62D 29/001* (2013.01); *C21D 1/673* (2013.01); *C21D 9/46* (2013.01); *C22C 21/00* (2013.01); *C22C 21/06* (2013.01); *C22F 1/04* (2013.01); *C22F 1/047* (2013.01); *B21D 35/006* (2013.01); *B62D 25/04* (2013.01); *C21D 8/0294* (2013.01); *C21D 2221/00* (2013.01)

(58) Field of Classification Search
  USPC .......................................................... 148/695
  See application file for complete search history.

(56) References Cited

FOREIGN PATENT DOCUMENTS

| | | |
|---|---|---|
| CN | 103421943 A | 12/2013 |
| DE | 102009008282 A1 | 8/2010 |
| DE | 102011001849 A1 | 10/2012 |
| DE | 102011052291 A1 | 1/2013 |
| DE | 102013013359 A1 | 4/2014 |
| EP | 2415882 A1 | 2/2012 |
| EP | 2415895 A1 | 2/2012 |
| JP | 2009148823 A | 7/2009 |

OTHER PUBLICATIONS

Office Action issued in Chinese Application No. 201510379439.4 dated Nov. 21, 2016.

Chinese Office Action in Application No. 201510379439.4 dated Aug. 3, 2017, 9 pages.

B-B

C-C

US 9,821,859 B2

METHOD FOR PRODUCING A MOTOR VEHICLE COMPONENT FROM ALUMINUM

RELATED APPLICATIONS

This application claims the benefit of German Application No. 10 2014 108 113.7, filed Jun. 10, 2014, which is incorporated herein by reference in its entirety.

The present invention relates to a method for producing a motor vehicle component as per the features in the preamble of patent claim 1.

It is known from the prior art for vehicle components and motor vehicle structural components to be produced from metallic materials. Here, a self-supporting motor vehicle body has imparted to it the rigidity required for normal vehicle operation. In recent years, however, the demands on motor vehicle bodies of said type have greatly increased. The focus is no longer just on styling, but is at the same time also on the targeted generation of characteristics in the event of a vehicle crash, and on consistent lightweight design.

In this regard, it is known from the prior art to use steel materials with which it is possible to provide components with high-strength or even ultra high-strength characteristics. Said high-strength or ultra high-strength characteristics are produced in targeted fashion in parts of the components.

It is alternatively known to produce motor vehicle components from aluminum. In this case, aluminum is used as a lightweight metal component and, owing to its low inherent specific weight, permits a corresponding weight saving. The production of the aluminum component for motor vehicles is known for example from DE 10 2009 008 282 A1.

It is an object of the present invention, taking the prior art as a starting point, to specify a method for producing a motor vehicle component from a light metal alloy, by means of which method it is possible in an economical and inexpensive manner to produce a motor vehicle component with regions of mutually different strength.

The above-stated object is achieved according to the invention by means of a production method according to the features in patent claim 1.

Advantageous design variants of the method will be described in the dependent patent claims.

The method according to the invention for producing a motor vehicle component is characterized by the following method steps:
  providing a strain-hardened blank composed of a 5000 grade aluminum alloy,
  partially heating the blank in at least one first region to a temperature higher than 350° C., in particular higher than 400° C., and in at least one second region to a temperature between 150° C. and 350° C., preferably to 300° C., in less than 20 s, preferably less than 10 s and in particular in 2 to 5 s,
  transferring the blank into a cooling tool, and performing cooling to preferably 5° C. to 40° C., in particular to room temperature, in less than 20 s, preferably less than 10 s and in particular in 2 to 5 s,
  generating a yield strength in the first region of less than 250 MPa and greater than 120 MPa and a yield strength in the second region of less than or equal to 450 MPa and greater than 200 MPa, wherein the yield strength of the second region is lower than the initial yield strength of the blank, but at least 50 MPa, preferably 100 MPa greater than the yield strength in the first region.

With the method according to the invention, it is thus possible for a strain-hardened 5000 grade aluminum blank to be heated and placed into a cooling tool with a transfer time of particularly preferably less than 5 s, and for the partially differently heated blank to in turn be cooled in a particularly short time in the cooling tool. The entire process is preferably performed in less than 50 s, particularly preferably less than 40 s and in particular less than 30 s. A flat blank with, in part, regions of mutually different strength is provided as a result, which blank can then be shaped in a downstream forming (deformation) operation to form a motor vehicle component with regions of mutually different strength. This results in particularly short operation cycles, in particular as the downstream forming (deformation) process, which then takes the form of cold forming, can be performed in a manner independent of time and temperature. The blank produced by means of the method according to the invention, which has regions of mutually different strengths, can in particular be produced for stock. The yield strength is the RP 0.2 yield strength.

The strain-hardened blank that is initially provided is provided as a naturally hard blank or a strain-hardened blank. Within said blank there is a dislocation density in the crystal lattice which possesses an initial strength or initial yield strength of between 400 MPa and 500 MPa. The thermal treatment, in particular the mutually different thermal treatment, reduces the dislocation density in the crystal lattice, whereby in turn, the yield strength of the originally provided blank is reduced, and owing to the, in part, mutually different action of temperature, it is also the case that, in part, mutually different yield strengths are generated. In particular, a relatively soft or relatively ductile material characteristic and a relatively low yield strength is provided in a connection region of the motor vehicle component, such that here, the motor vehicle component is prevented from being broken off or torn away in the event of a crash. These characteristics are also attained by means of the method variants described below, or can be generated in targeted fashion by means of said method variants.

An alternative configuration variant of the method according to the invention provides for the forming operation to be integrated directly into the temperature adjustment process. For this purpose, one method provides the following method steps:
  providing a strain-hardened blank composed of a 5000 grade aluminum alloy,
  partially heating the blank in at least one first region to a temperature higher than 350° C., in particular higher than 400° C., and in at least one second region to a temperature between 150° C. and 350° C., preferably to 300° C., in less than 20 s, preferably less than 10 s and in particular in 2 to 5 s,
  transferring the blank into a forming (deformation tool) tool, the cooling being performed to preferably 5° C. to 40° C., in particular to room temperature, during and after the forming,
  generating a yield strength in the first region of less than 250 MPa and greater than 120 MPa and a yield strength in the second region of less than or equal to 450 MPa and greater than 200 MPa, wherein the yield strength of the second region is lower than the initial yield strength of the blank, but at least 50 MPa, preferably 100 MPa greater than the yield strength in the first region.

The forming tool (deformation tool) is in this case a combined forming and cooling tool. The cooling may at least commence already during the forming process, such that slight cooling takes place already when the blank first makes contact with the forming tool, which is in particular in the form of a pressing tool, and the final cooling is then performed after the forming tool has been fully closed. In particular, in this stated method but also in all other stated method variants in this disclosure, the cooling is performed homogeneously such that the blank as a whole or the deformed component is completely cooled. That is to say, the differently temperature-adjusted regions are jointly cooled to a desired target temperature, which is preferably room temperature. Alternatively, the cooling is performed in the combined forming and cooling tool such that, initially, the blank that has been temperature-adjusted to mutually different temperature ranges is deformed completed. In the context of the invention, any cooling phenomena that commence beforehand as a result of the contact with the forming tool can be disregarded.

A further configuration variant of the method according to the invention provides the following method steps:
- providing a strain-hardened blank composed of a 5000 grade aluminum alloy,
- partially heating the blank in at least one first region to a temperature higher than 350° C., in particular higher than 400° C., and at least in a second region to a temperature between 150° C. and 350° C., preferably to 300° C., in less than 20 s, preferably less than 10 s and in particular in 2 to 5 s,
- transferring the blank into a forming tool, in the forming tool the forming takes place in less than 20 s, preferably less than 10 s and in particular in 2 to 5 s,
- transferring the blank into a cooling tool, and performing cooling to preferably 5° C. to 40° C., in particular to room temperature, in less than 20 s, preferably less than 10 s and in particular in 2 to 5 s,
- generating a yield strength in the first region of less than 250 MPa and greater than 120 MPa and a yield strength in the second region of less than or equal to 450 MPa and greater than 200 MPa, wherein the yield strength of the second region is lower than the initial yield strength of the blank, but at least 50 MPa, preferably 100 MPa greater than the yield strength in the first region.

In this method variant, it is the case in particular that rapid forming is performed such that the forming itself takes place in less than 20 s. In particular, this in turn yields the advantage that, after the completion of the forming process, the forming tool does not have to be held closed so as to effect complete cooling, but can be directly opened again, with the actual cooling process then taking place in a separate cooling tool further downstream. In particular, in this configuration variant, a particularly short cycle time of the method according to the invention is realized.

In the context of the invention, use is preferably made of an aluminum alloy with the designation AW/AA5xxx-Hxx. This is preferably a strain-hardened aluminum alloy which has been correspondingly strain-hardened in particular by way of a prior rolling process, and which may optionally have been subjected to thermal aftertreatment in intermediate steps or subsequently. This refers in particular to a cold-rolling process prior to the heating according to the invention. The cold rolling causes dislocations to be formed in the crystal lattice, such that the strain-hardened aluminum alloy has an initial yield strength of between 200 MPa and 500 MPa, in particular 300 MPa to 450 MPa. The strength state can be verified on the strain-hardened starting material, or else on a motor vehicle component produced therefrom, by way of a tensile test. In particular, an aluminum alloy conforming to the European standard EN515:1993 in the material state H12, H14, H16, H18, H19, H22, H24, H26, H28, H32, H34, H36 or H38 is processed, this having, as alloy elements aside from aluminum, at least magnesium and possibly manganese and further alloy elements.

In particular, with all method variants, strengths between 250 MPa and 120 MPa are generated in a first region, and strengths between 450 MPa and 200 MPa are generated in the second region. Consequently, a relatively hard region, and a region which is softer or more ductile than the former region, are generated in the blank and then indirectly in the motor vehicle component produced further downstream, or in the case of direct production of the motor vehicle component, said regions are generated in said motor vehicle component directly.

It is furthermore particularly preferable for the blank or the component to undergo final trimming before, during or after the forming. It is then hereby possible for the external component contour to be defined.

In a particularly preferred design variant, a blank having at least two mutually different wall thicknesses is deformed. In particular, use is made here of a tailored material, wherein the different wall thicknesses are produced in particular by partial rolling during the cold-rolling process. This is known as a tailored rolled blank. In the context of the invention, it is however also possible for use to be made of a tailored welded blank, that is to say a blank in which two sheet-metal blank parts of different wall thickness have been thermally joined together. Friction stir welding is particularly suitable for this, though other cohesive coupling methods may also be used. In the context of the invention, it is however also possible for a patched blank to be used, such that a component patch is applied locally to the blank. The blank is then deformed together with the component patch. In this case, the component patch is in particular adhesively bonded to the blank and fixed in position by mechanical or thermal methods, for example clinching, riveting, friction stir welding or spot welding, wherein the adhesive can be thermally activated and, when the blank is heated to forming temperature, is correspondingly adhesively bonded together with the blank.

With regard to the generation of the yield strength in the finished motor vehicle component, the values relate in each case to the main blank, that is to say to the larger of the blanks, to which at least one patch blank has been applied.

As material for the patch blank, use may be made of the same aluminum alloy as for the main blank. In this case, the initial, shipped state, or the thermal treatment, of the patch blank should be selected such that, during the forming, at least the deformability of the corresponding region of the main blank is attained. The same however also applies in the case of a different patch material being used.

It is particularly preferable, in the case of the tailored material, for a blank with thickness variations between 1 mm and 10 mm, in particular from 2 mm to 6 mm wall thickness, to be deformed. The blank may then have greater wall thicknesses at least in parts, wherein the greater wall thicknesses are between 2 mm and 15 mm, in particular between 3 mm and 12 mm and very particularly preferably between 3.5 mm and 10 mm, and are in particular up to 3 mm thicker than the other regions of the blank.

In particular, with the method according to the invention, a motor vehicle component composed of an aluminum alloy is produced which, in the event of a collision, is intended to locally undergo a forming which is predefined in terms of its configuration, wherein the motor vehicle component can be made more ductile and softer in trimming regions and/or coupling sections.

Furthermore, the motor vehicle component may be joined to further reinforcement parts. The reinforcement parts may also be produced in accordance with the method according to the invention. The reinforcement parts themselves are joined to the motor vehicle component preferably after the completion of the forming process. Said reinforcement parts constitute in particular an inner reinforcement and/or an outer reinforcement. The inner reinforcement may for example be applied in the form of a patch to the motor vehicle component that has been produced. In the context of the invention, it is however also possible for a corresponding hollow component to be produced by way of the coupling to the inner reinforcement and/or to the outer reinforcement. The reinforcements are in particular also aluminum components. The reinforcement may however also be in the form of a steel component, or applied in the form of a fiber composite material. It is particularly preferable for the reinforcement to be adhesively bonded to the motor vehicle component. The adhesive bonding is in particular combined with a thermal or mechanical joining process in order to hold the reinforcement in position during the hardening process. In the context of the invention, it is however also possible for the two components to be thermally joined to one another. Positively locking coupling methods such as riveting, in particular punch riveting, or a clinching process are also possible.

Here, in the context of the invention, the cooling tool may be a flat cooling tool which effects cooling by way of abutting contact. In the context of the invention, it is however also possible, for example, for the cooling tool to be in the form of a dip tank, such that the temperature-adjusted blank as a whole, and/or the motor vehicle component that has been produced with temperature adjustment and deformed, are/is immersed in the dip tank and thus cooled.

In the context of the invention, however, it is basically always the case in all design variants that the blank as a whole, and/or the motor vehicle component as a whole, are/is completely cooled. Furthermore, the cooling may be performed in a first and a second cooling process. In this case, cooling to a temperature between 120° C. and 200° C. is performed in the first cooling process, and cooling to substantially room temperature is performed in the second cooling process. The two cooling processes may in this case be performed in one cooling tool, or else may be performed in two mutually separate cooling tools. In particular, use is made of a combined forming and cooling tool. If the first cooling process is performed in the forming and cooling tool, the second cooling process is then particularly preferably performed in a second cooling tool that is separate therefrom.

In the context of the invention, the blank or the component is furthermore particularly preferably subjected to surface treatment. This is to be understood in particular to mean a coating process, very particularly preferably a conversion coating process. The surface treatment of the blank or of the component has an advantageous effect in particular on the further processing with regard to joining. Owing to the surface treatment, the blank or the component has defined, reproducible surface characteristics, by contrast to the inhomogenous and contaminated oxide layer that forms of its own accord under environmental influences. This has a positive effect in particular on all subsequent manufacturing processes which produce a connection to said surface, such as for example adhesive bonding or painting, or which, for stabilization of the process, require highly reproducible initial characteristics, such as for example arc welding.

In the context of the invention, to carry out the method, use is made in particular of a tool which has different sections, wherein the sections in the tool can assume mutually different temperatures with regard to heating or cooling, and said sections are brought into contact with the blank with elevated contact pressure. In this way, it is then possible to realize the different temperature gradients in the blank in those regions therein which are to be adjusted to different temperatures. The different sections in the forming and/or temperature adjustment tool may for example be realized by way of mutually independent temperature adjustment segments, which are in particular insulated with respect to one another.

Figure 1B:
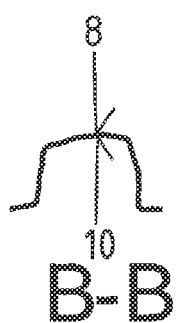
Figure 2A:
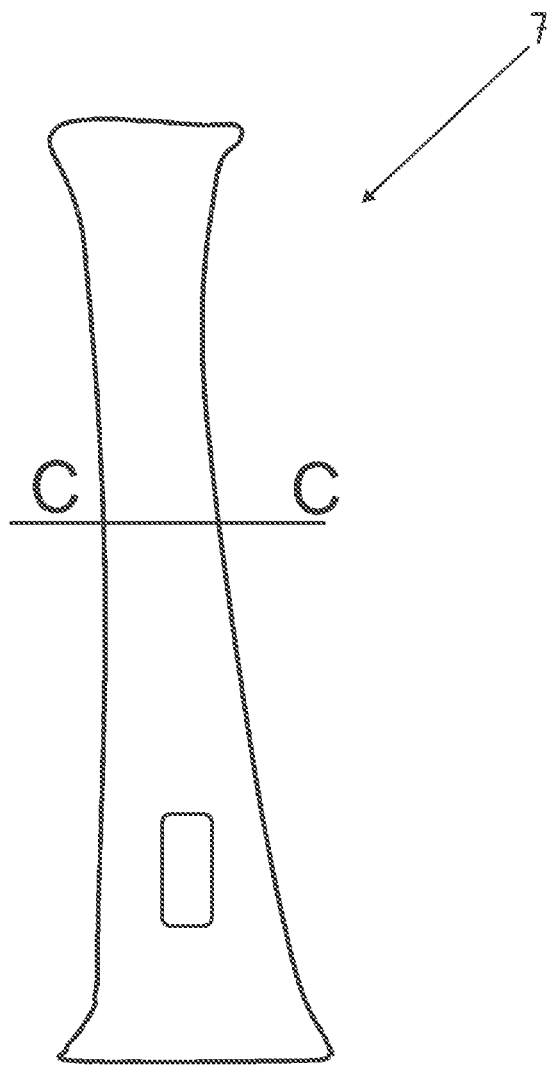
Figure 2B:
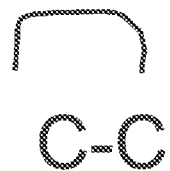

Further advantages, features, characteristics and aspects of the present invention will be discussed in the following description and illustrated in the schematic figures. Said figures serve to give a clearer understanding of the invention. In the figures:

FIGS. 1a and 1b show a side view and a cross-sectional view of a motor vehicle B pillar produced according to the invention, FIGS. 2a and 2b show an outer reinforcement panel for a motor vehicle B pillar as per FIG. 1, and FIGS. 3a to 3c show an inner reinforcement panel.

In the figures, the same reference signs are used for identical or similar components, even if a repeated description is omitted for simplicity.

FIG. 1a shows a motor vehicle component 1 according to the invention in the form of a B pillar, in a side view. The B pillar has a head region 2 for connection to a roof beam (not illustrated in any more detail) and a foot region 3 for connection to a side sill (not illustrated in any more detail). Between the head region 2 and the foot region 3 there extends a central section 4 with an opening Ö. According to the invention, it is now the case that the foot region 3 and a lower part of the central section 4 are formed as a first region 5 which, during the forming process, is kept at the forming temperature, such that a relatively soft or relatively ductile microstructure, with preferably between 120 and 250 MPa, is generated here. The upper central section 4 and the head region 2 are in this case formed as a second region 6, which has harder characteristics than the first region 5 and has a yield strength of between 250 MPa and 450 MPa. The first region 5 and second region 6 are separated by a transition Ü which extends over 1 mm to 100 mm, preferably 15 mm to 50 mm. FIG. 1b shows a cross section as per the section line B-B, such that it can be seen that, during the forming process, at least the central section 4 has been formed in the manner of a hat-shaped profile in cross section. The component has thus been three-dimensionally shaped.

Furthermore, FIGS. 2a and b illustrate an outer reinforcement panel 7 in a side view and in a cross-sectional view. The outer reinforcement panel 7 has a substantially homogeneous cross-sectional profile and is, as per FIG. 2b, in the form of a U-shaped reinforcement panel. This is applied to the outer side 8, as per FIG. 1b, of the motor vehicle component 1, in particular by adhesive bonding, particularly preferably by way of an adhesive that can be thermally activated.

Figure 3A:
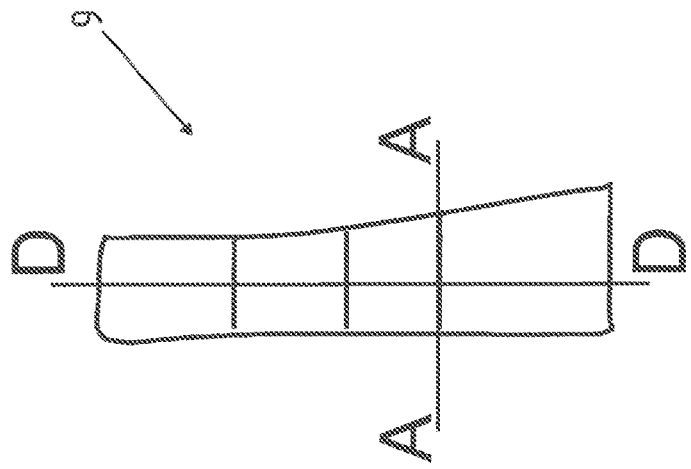
Figure 3B:
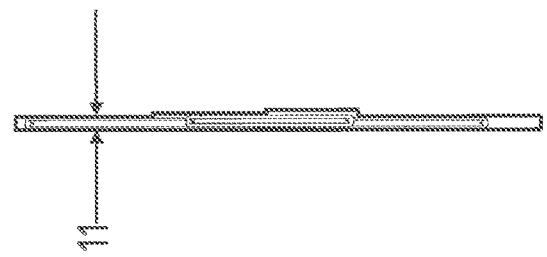
Figure 3C:

FIGS. 3a to c furthermore illustrate an inner reinforcement panel 9, which is illustrated in a side view in FIG. 3a, in a longitudinal section in FIG. 3b, and in a transverse section in FIG. 3c. The inner reinforcement panel 9 is applied to an inner side, as per FIG. 1b, of the B pillar. Along the longitudinal section line D-D, the inner reinforcement panel 9 has mutually different wall thicknesses 11 in parts over the longitudinal profile. The cross-sectional profile illustrated in FIG. 3c follows section line A-A, wherein said cross-sectional profile is of homogeneous and flat form. The inner reinforcement panel 9 is applied to the inner side 10 as per FIG. 1b, preferably by adhesive bonding.

The inner reinforcement panel is preferably produced from an aluminum alloy which has been extruded to form a profile, wherein different wall thicknesses in the profile are generated and, in a subsequent process step, the profile is trimmed longitudinally, optionally unwound into a flat form, and/or press-molded into its final shape.

REFERENCE SIGNS

1—Motor vehicle component
2—Head region
3—Foot region
4—Central section
5—First region
6—Second region
7—Outer reinforcement panel
8—Outer side of 1
9—Inner reinforcement panel
10—Inner side of 1
11—Wall thickness
Ö—Opening
Ü—Transition

The invention claimed is:

1. A method for producing a motor vehicle component, comprising:
    providing a strain-hardened blank composed of a 5000 grade aluminum alloy,
    partially heating the blank in a first region to a temperature higher than 350° C. and in a second region to a temperature between 150° C. and 350° C., in less than 20 s,
    transferring the blank into a cooling tool, and performing cooling in less than 20 s,
    generating a yield strength in the first region of less than 250 MPa and greater than 120 MPa, and a yield strength in the second region of less than 450 MPa and greater than 200 MPa.

2. The method as claimed in claim 1, wherein the cooling is performed in a forming tool, the cooling being performed during and/or after the forming.

3. The method as claimed in claim 2, wherein the forming and cooling are performed in a combined forming and cooling tool in less than 20 s.

4. The method as claimed in claim 1, wherein the partially heated blank is transferred into a forming tool and subjected to rapid forming, and after the completion of the forming process, is transferred into the cooling tool and cooled.

5. The method as claimed in claim 1, wherein the blank is trimmed, in particular subjected to final trimming, before, during or after the forming.

6. The method as claimed in claim 1, wherein a blank having at least two mutually different wall thicknesses is deformed.

7. The method as claimed in claim 1, wherein a motor vehicle pillar composed of aluminum is produced, the motor vehicle pillar being coupled, to an inner reinforcement panel and/or an outer reinforcement panel, and the coupling being performed before the forming or after the forming of the blank.

8. The method as claimed in claim 1, wherein the cooling is performed in a first and a second cooling process, cooling to a temperature between 120 and 200° C. being performed in the first cooling process, and the first cooling process being performed in less than 20 s, and cooling to room temperature being performed in the second cooling process, the second cooling process being performed in less than 20 s.

9. The method as claimed in claim 1, wherein the second cooling process is performed in a separate cooling tool.

10. The method as claimed in claim 1, wherein the blank is subjected to surface treatment, the blank preferably being coated and in particular conversion-coated.

11. The method as claimed in claim 1, wherein the partially heating the blank in a first region to a temperature higher than 350° C. includes heating to a temperature higher than 400° C.

12. The method as claimed in claim 1, wherein partially heating the blank in a second region to a temperature between 150° C. and 350° C. comprises heating to a temperature of 300° C.

13. The method as claimed in claim 1, wherein partially heating in less than 20 s comprises partially heating in less than 10 s.

14. The method as claimed in claim 2, wherein the forming and cooling are performed in a combined forming and cooling tool in less than 10 s.

15. The method as claimed in claim 1, further comprising adhesively bonding the motor vehicle pillar to an inner reinforcement panel.

16. The method as claimed in claim 15, further comprising a thermally activatable adhesive for adhesively bonding the motor vehicle pillar to the inner reinforcement panel.

17. The method as claimed in claim 1, further comprising a first cooling process being performed in less than 10 s.

18. The method as claimed in claim 1, further comprising a second cooling process being performed in less than 10 s.

* * * * *